US010742913B2

(12) United States Patent
Vaklev et al.

(10) Patent No.: US 10,742,913 B2
(45) Date of Patent: Aug. 11, 2020

(54) SHUTTERLESS CALIBRATION

(71) Applicant: N2 Imaging Systems, LLC, Irvine, CA (US)

(72) Inventors: Martin Vaklev, Irvine, CA (US); Francis M. Vu, Huntington Beach, CA (US); Scott Richman, Irvine, CA (US)

(73) Assignee: N2 Imaging Systems, LLC, Irvine, CA (US)

( * ) Notice: Subject to any disclaimer, the term of this patent is extended or adjusted under 35 U.S.C. 154(b) by 0 days.

(21) Appl. No.: 16/058,572

(22) Filed: Aug. 8, 2018

(65) Prior Publication Data

US 2020/0053303 A1 Feb. 13, 2020

(51) Int. Cl.
*H04N 5/365* (2011.01)
*H04N 5/33* (2006.01)

(52) U.S. Cl.
CPC ............. *H04N 5/3651* (2013.01); *H04N 5/33* (2013.01)

(58) Field of Classification Search
CPC ................................ H04N 5/3651; H04N 5/33
See application file for complete search history.

(56) References Cited

U.S. PATENT DOCUMENTS

| | | |
|---|---|---|
| 2,452,592 A | 11/1948 | Meyer |
| 2,627,659 A | 2/1953 | Murr |
| 2,901,750 A | 9/1959 | McMurry |
| 2,901,751 A | 9/1959 | Gales et al. |
| 2,908,943 A | 10/1959 | Miller |
| 3,320,619 A | 5/1967 | Lastnik et al. |
| 3,413,656 A | 12/1968 | Vogliano et al. |
| 3,419,334 A | 12/1968 | Hubbard |
| 3,594,062 A | 7/1971 | Disley |
| 3,640,635 A | 2/1972 | Von Hollen |
| 3,669,523 A | 6/1972 | Edwards |
| 4,044,399 A | 8/1977 | Morton |
| 4,183,646 A | 1/1980 | Tsunefuji |
| 4,584,776 A | 4/1986 | Shepherd |

(Continued)

FOREIGN PATENT DOCUMENTS

| | | |
|---|---|---|
| CN | 202057884 | 11/2011 |
| CN | 204730844 | 10/2015 |

(Continued)

OTHER PUBLICATIONS

Aebi, V. et al., "EBAPS: Next Generation, Low Power, Digital Night Vision", Presented at the OPTRO 2005 International Symposium, May 10, 2005, pp. 1-10, Paris, France, in 10 pages.

(Continued)

*Primary Examiner* — Michael E Teitelbaum
(74) *Attorney, Agent, or Firm* — Knobbe, Martens, Olson & Bear, LLP

(57) ABSTRACT

An imaging system includes a focal plane array including an array of pixels. An isothermal diaphragm covers a first portion of the pixels along a periphery of the array and exposing an imaging portion of the pixels. A controller is operatively connected to the focal plane array to read sensor data from the focal plane array, wherein the sensor data includes image data from the imaging portion of the pixels and non-uniformity data from the first portion of the pixels. The controller is operatively connected to the focal plane array to enhance the image data based on the non-uniformity data.

8 Claims, 2 Drawing Sheets

(56) References Cited

U.S. PATENT DOCUMENTS

| | | |
|---|---|---|
| 4,601,540 A | 7/1986 | Karning et al. |
| 4,605,281 A | 8/1986 | Hellewell |
| 4,698,489 A | 10/1987 | Morley |
| 4,758,719 A | 7/1988 | Sasaki et al. |
| 4,786,966 A | 11/1988 | Hanson et al. |
| 4,792,206 A | 12/1988 | Skuratovsky |
| 4,840,451 A | 6/1989 | Sampson et al. |
| 5,005,213 A | 4/1991 | Hanson et al. |
| 5,035,472 A | 7/1991 | Hansen |
| 5,125,394 A | 6/1992 | Chatenever et al. |
| 5,128,807 A | 7/1992 | Blackmon |
| 5,140,151 A | 8/1992 | Weiner et al. |
| 5,303,606 A | 4/1994 | Kokinda |
| 5,303,688 A | 4/1994 | Chiuminatta et al. |
| 5,359,675 A | 10/1994 | Siwoff |
| 5,448,161 A | 9/1995 | Byerley, III et al. |
| 5,463,495 A | 10/1995 | Murg |
| 5,513,440 A | 5/1996 | Murg |
| 5,535,053 A | 7/1996 | Baril et al. |
| 5,584,137 A | 12/1996 | Teetzel |
| 5,651,081 A | 7/1997 | Blew et al. |
| 5,653,034 A | 8/1997 | Bindon |
| 5,668,904 A | 9/1997 | Sutherland et al. |
| 5,687,271 A | 11/1997 | Rabinowitz |
| 5,711,104 A | 1/1998 | Schmitz |
| 5,847,753 A | 12/1998 | Gabello et al. |
| 5,881,449 A | 3/1999 | Ghosh et al. |
| 5,903,996 A | 5/1999 | Morley |
| 5,946,132 A | 8/1999 | Phillips |
| 5,949,565 A | 9/1999 | Ishida |
| 5,953,761 A | 9/1999 | Jurga et al. |
| 5,956,444 A | 9/1999 | Duda et al. |
| 6,020,994 A | 2/2000 | Cook |
| 6,057,966 A | 5/2000 | Carroll et al. |
| 6,200,041 B1 | 3/2001 | Gaio et al. |
| 6,272,692 B1 | 8/2001 | Abraham |
| 6,311,576 B1 | 11/2001 | Pletschet |
| 6,327,381 B1 | 12/2001 | Rogina et al. |
| 6,369,941 B2 | 4/2002 | Zadravec |
| 6,381,081 B1 | 4/2002 | Ford |
| 6,404,961 B1 | 6/2002 | Bonja et al. |
| 6,456,497 B1 | 9/2002 | Palmer |
| 6,519,890 B1 | 2/2003 | Otterman |
| 6,560,029 B1 | 5/2003 | Dobbie et al. |
| 6,574,053 B1 | 6/2003 | Spinali |
| 6,615,531 B1 | 9/2003 | Holmberg |
| 6,690,866 B2 | 2/2004 | Bonja et al. |
| 6,714,708 B2 | 3/2004 | McAlpine et al. |
| 6,807,742 B2 | 10/2004 | Schick et al. |
| 6,898,192 B2 | 5/2005 | Chheda et al. |
| 6,901,221 B1 | 5/2005 | Jiang et al. |
| 7,016,579 B2 | 3/2006 | Militaru et al. |
| 7,062,796 B1 | 6/2006 | Dixon |
| D524,785 S | 7/2006 | Huang |
| 7,069,685 B2 | 7/2006 | Houde-Walter |
| 7,096,512 B2 | 8/2006 | Blair |
| 7,128,475 B2 | 10/2006 | Kesler |
| 7,132,648 B2 | 11/2006 | Ratiff et al. |
| 7,166,812 B2 | 1/2007 | White et al. |
| 7,171,776 B2 | 2/2007 | Staley, III |
| 7,194,012 B2 | 3/2007 | Mason et al. |
| 7,210,262 B2 | 5/2007 | Florence et al. |
| 7,210,392 B2 | 5/2007 | Greene et al. |
| 7,219,370 B1 | 5/2007 | Teetzel et al. |
| 7,278,734 B2 | 10/2007 | Jannard et al. |
| 7,292,262 B2 | 11/2007 | Towery et al. |
| 7,298,941 B2 | 11/2007 | Palen et al. |
| 7,319,557 B2 | 1/2008 | Tai |
| 7,369,302 B2 | 5/2008 | Gaber |
| 7,409,792 B2 | 8/2008 | Narcy et al. |
| 7,437,848 B2 | 10/2008 | Chang |
| 7,462,035 B2 | 12/2008 | Lee et al. |
| 7,488,294 B2 | 2/2009 | Torch |
| 7,552,559 B2 | 6/2009 | Day |
| 7,609,467 B2 | 10/2009 | Blanding et al. |
| 7,612,956 B2 | 11/2009 | Blanding et al. |
| 7,627,975 B1 | 12/2009 | Hines |
| 7,649,550 B2 | 1/2010 | Ishiyama et al. |
| 7,676,137 B2 | 3/2010 | Schick et al. |
| 7,690,849 B2 | 4/2010 | Scharf et al. |
| 7,701,493 B2 | 4/2010 | Mauritzson |
| 7,705,855 B2 | 4/2010 | Brown Elliott |
| 7,710,654 B2 | 5/2010 | Ashkenazi et al. |
| 7,730,820 B2 | 6/2010 | Vice et al. |
| 7,740,499 B1 | 6/2010 | Willey et al. |
| 7,744,286 B2 | 6/2010 | Lu et al. |
| 7,787,012 B2 | 8/2010 | Scales et al. |
| 7,795,574 B2 | 9/2010 | Kennedy et al. |
| 7,800,852 B2 | 9/2010 | Blanding et al. |
| 7,827,723 B1 | 11/2010 | Zaderey et al. |
| 7,832,023 B2 | 11/2010 | Crisco |
| 7,842,922 B2 | 11/2010 | Leneke et al. |
| 7,899,332 B2 | 3/2011 | Shindou et al. |
| 7,911,687 B2 | 3/2011 | Scholz |
| 7,916,156 B2 | 3/2011 | Brown Elliott et al. |
| 7,933,464 B2 | 4/2011 | Zhang et al. |
| 7,952,059 B2 | 5/2011 | Vitale et al. |
| 7,972,067 B2 | 7/2011 | Haley et al. |
| 7,990,523 B2 | 8/2011 | Schlierbach et al. |
| 8,014,679 B2 | 9/2011 | Yamazaki |
| 8,063,934 B2 | 11/2011 | Donato |
| 8,067,735 B2 | 11/2011 | King et al. |
| 8,082,688 B2 | 12/2011 | Elpedes et al. |
| 8,085,482 B2 | 12/2011 | Frankovich et al. |
| 8,093,992 B2 | 1/2012 | Jancic et al. |
| 8,112,185 B2 | 2/2012 | Wu |
| 8,153,975 B2 | 4/2012 | Hollander et al. |
| 8,225,542 B2 | 7/2012 | Houde-Walter |
| 8,253,105 B1 | 8/2012 | Warnke et al. |
| 8,312,667 B2 | 11/2012 | Thomas et al. |
| 8,336,776 B2 | 12/2012 | Horvath et al. |
| 8,337,036 B2 | 12/2012 | Soto et al. |
| 8,350,796 B2 | 1/2013 | Tomizawa et al. |
| 8,375,620 B2 | 2/2013 | Staley, III |
| D677,298 S | 3/2013 | Hallgren |
| 8,411,346 B2 | 4/2013 | Sapir |
| 8,488,969 B1 | 7/2013 | Masarik |
| 8,531,592 B2 | 9/2013 | Teetzel et al. |
| 8,532,490 B2 | 9/2013 | Smith et al. |
| 8,656,628 B2 | 2/2014 | Jock et al. |
| 8,717,392 B2 | 5/2014 | Levola |
| 8,773,766 B2 | 7/2014 | Jannard et al. |
| 8,776,422 B2 | 7/2014 | Dodd et al. |
| 8,781,273 B2 | 7/2014 | Benjamin et al. |
| 8,826,583 B2 | 9/2014 | Kepler et al. |
| 8,849,379 B2 | 9/2014 | Abreu |
| 8,886,046 B2 | 11/2014 | Masarik |
| 8,908,045 B2 | 12/2014 | Stewart |
| 8,923,703 B2 | 12/2014 | Masarik |
| 8,928,878 B2 | 1/2015 | Jaeschke et al. |
| 8,942,632 B2 | 1/2015 | Shen |
| 8,963,573 B2 | 2/2015 | Achkir et al. |
| 9,042,736 B2 | 5/2015 | Masarik |
| 9,052,153 B2 | 6/2015 | Oh et al. |
| 9,057,583 B2 | 6/2015 | Matthews et al. |
| 9,069,001 B2 | 6/2015 | Braman et al. |
| 9,113,061 B1 | 8/2015 | Morley |
| 9,225,419 B2 | 12/2015 | Masarik |
| 9,310,163 B2 | 4/2016 | Bay |
| 9,316,462 B2 | 4/2016 | Varshneya |
| 9,319,143 B2 | 4/2016 | El-Ahmadi et al. |
| 9,335,122 B2 | 5/2016 | Choiniere |
| 9,366,504 B2 | 6/2016 | Hester et al. |
| 9,373,277 B2 | 6/2016 | Sagan |
| 9,389,677 B2 | 7/2016 | Hobby et al. |
| 9,429,391 B2 | 8/2016 | Walker |
| 9,438,774 B2 | 9/2016 | Masarik |
| 9,466,120 B2 | 10/2016 | Maryfield et al. |
| 9,506,725 B2 | 11/2016 | Maryfield et al. |
| 9,516,202 B2 | 12/2016 | Masarik et al. |
| 9,593,913 B1 | 3/2017 | Wright et al. |
| 9,615,004 B2 | 4/2017 | Masarik |
| 9,622,529 B2 | 4/2017 | Teetzel et al. |
| 9,658,423 B2 | 5/2017 | Gustafson et al. |

(56) References Cited

U.S. PATENT DOCUMENTS

| | | |
|---|---|---|
| 9,696,111 B2 | 7/2017 | Saadon |
| 9,705,605 B2 | 7/2017 | Masarik |
| 9,769,902 B1 | 9/2017 | Cain et al. |
| 9,823,043 B2 | 11/2017 | Compton et al. |
| 9,861,263 B2 | 1/2018 | Kwan et al. |
| 9,897,411 B2 | 2/2018 | Compton et al. |
| 9,910,259 B2 | 3/2018 | Armbruster et al. |
| 9,921,028 B2 | 3/2018 | Compton et al. |
| 9,934,739 B2 | 4/2018 | Hogan |
| 9,948,878 B2 | 4/2018 | Simolon et al. |
| 9,995,901 B2 | 6/2018 | Petersen |
| 10,003,756 B2 | 6/2018 | Masarik et al. |
| 10,024,631 B2 | 7/2018 | Portoghese et al. |
| 10,036,869 B2 | 7/2018 | Fahr et al. |
| 10,095,089 B2 | 10/2018 | Po et al. |
| 10,113,837 B2 | 10/2018 | Masarik et al. |
| 10,190,848 B2 | 1/2019 | VanBecelaere |
| 10,309,749 B2 | 6/2019 | Hamilton |
| 10,379,135 B2 | 8/2019 | Maryfield et al. |
| 2002/0027690 A1 | 3/2002 | Bartur et al. |
| 2004/0031184 A1 | 2/2004 | Hope |
| 2005/0058444 A1 | 3/2005 | Watanabe et al. |
| 2005/0114710 A1 | 5/2005 | Cornell et al. |
| 2005/0225575 A1 | 10/2005 | Brown Elliott et al. |
| 2005/0232512 A1* | 10/2005 | Luk .................... G06K 9/6293 382/276 |
| 2005/0254126 A1 | 11/2005 | Lin et al. |
| 2005/0268519 A1 | 12/2005 | Pikielny |
| 2006/0165413 A1 | 7/2006 | Schemmann et al. |
| 2006/0192864 A1* | 8/2006 | Mauritzson ....... H01L 27/14603 348/241 |
| 2007/0003562 A1 | 1/2007 | Druilhe |
| 2007/0035626 A1 | 2/2007 | Randall et al. |
| 2007/0213586 A1 | 9/2007 | Hirose et al. |
| 2007/0257944 A1 | 11/2007 | Miller et al. |
| 2008/0107346 A1* | 5/2008 | Zhang ................... G06T 3/4053 382/215 |
| 2008/0216883 A1* | 9/2008 | Leneke .................... G01J 5/06 136/224 |
| 2008/0263752 A1 | 10/2008 | Solinsky et al. |
| 2008/0309586 A1 | 12/2008 | Vitale |
| 2008/0317474 A1 | 12/2008 | Wang et al. |
| 2009/0052023 A1 | 2/2009 | Winker et al. |
| 2009/0181729 A1 | 7/2009 | Griffin, Jr. et al. |
| 2010/0027943 A1 | 2/2010 | Armani et al. |
| 2010/0149073 A1 | 6/2010 | Chaum et al. |
| 2010/0225673 A1 | 9/2010 | Miller et al. |
| 2010/0266245 A1 | 10/2010 | Sabo |
| 2010/0308999 A1 | 12/2010 | Chornenky |
| 2010/0328420 A1 | 12/2010 | Roman |
| 2011/0030264 A1 | 2/2011 | Davidson et al. |
| 2011/0041377 A1 | 2/2011 | Thomas et al. |
| 2011/0067288 A1 | 3/2011 | Hakansson et al. |
| 2011/0145981 A1 | 6/2011 | Teetzel |
| 2011/0187563 A1 | 8/2011 | Sanders-Reed |
| 2011/0213664 A1 | 9/2011 | Osterhout et al. |
| 2011/0214082 A1 | 9/2011 | Osterhout et al. |
| 2011/0239354 A1 | 10/2011 | Celona et al. |
| 2012/0030985 A1 | 2/2012 | Mauricio et al. |
| 2012/0033195 A1 | 2/2012 | Tai |
| 2012/0097741 A1 | 4/2012 | Karcher |
| 2012/0159833 A1 | 6/2012 | Hakanson et al. |
| 2012/0182417 A1 | 7/2012 | Everett |
| 2012/0182610 A1 | 7/2012 | O'Hara et al. |
| 2012/0192476 A1 | 8/2012 | Compton et al. |
| 2012/0212414 A1 | 8/2012 | Osterhout et al. |
| 2012/0238208 A1 | 9/2012 | Bienas et al. |
| 2012/0255213 A1 | 10/2012 | Panos |
| 2012/0311910 A1 | 12/2012 | Mironichev et al. |
| 2012/0317706 A1 | 12/2012 | Lebel et al. |
| 2012/0320340 A1 | 12/2012 | Coleman, III |
| 2012/0327247 A1 | 12/2012 | Mironichev et al. |
| 2013/0016215 A1 | 1/2013 | Bitar et al. |
| 2013/0033746 A1 | 2/2013 | Brumfield |
| 2013/0036646 A1 | 2/2013 | Rubac et al. |
| 2013/0072120 A1 | 3/2013 | Wu |
| 2013/0088604 A1 | 4/2013 | Hamrelius et al. |
| 2013/0167425 A1 | 7/2013 | Crispin |
| 2013/0188943 A1 | 7/2013 | Wu |
| 2013/0215395 A1 | 8/2013 | Li |
| 2014/0007485 A1 | 1/2014 | Castejon, Sr. |
| 2014/0104449 A1 | 4/2014 | Masarik et al. |
| 2014/0260748 A1 | 9/2014 | Traver |
| 2014/0285882 A1 | 9/2014 | Gotz et al. |
| 2015/0016817 A1 | 1/2015 | Hara et al. |
| 2015/0101234 A1 | 4/2015 | Priest et al. |
| 2015/0226613 A1 | 8/2015 | Bauer et al. |
| 2015/0282549 A1 | 10/2015 | Lebel et al. |
| 2015/0316351 A1 | 11/2015 | Choiniere |
| 2015/0375865 A1 | 12/2015 | Fischer et al. |
| 2016/0033234 A1 | 2/2016 | Swift et al. |
| 2016/0327365 A1 | 11/2016 | Collin et al. |
| 2017/0010073 A1 | 1/2017 | Downing |
| 2017/0078022 A1 | 3/2017 | Masarik et al. |
| 2017/0153713 A1 | 6/2017 | Niinuma et al. |
| 2017/0237919 A1 | 8/2017 | Lamesch |
| 2017/0302386 A1 | 10/2017 | Masarik |
| 2018/0232952 A1 | 8/2018 | Hiranandani et al. |
| 2018/0246135 A1 | 8/2018 | Pan et al. |
| 2018/0302576 A1 | 10/2018 | Masarik et al. |
| 2019/0033039 A1 | 1/2019 | Masarik et al. |
| 2019/0094981 A1 | 3/2019 | Bradski et al. |
| 2019/0166174 A1 | 5/2019 | Moseman |
| 2019/0353461 A1 | 11/2019 | Neal et al. |
| 2019/0353462 A1 | 11/2019 | Neal |
| 2020/0014887 A1 | 1/2020 | Moseman et al. |
| 2020/0051481 A1 | 2/2020 | Masarik et al. |

FOREIGN PATENT DOCUMENTS

| | | |
|---|---|---|
| CN | 204944509 | 1/2016 |
| CN | 106612141 | 5/2017 |
| EP | 0 176 169 | 4/1986 |
| EP | 2 722 632 | 4/2014 |
| EP | 2 812 749 | 12/2014 |
| EP | 3 172 524 | 5/2017 |
| EP | 3 205 974 | 8/2017 |
| EP | 3 239 754 | 11/2017 |
| GB | 2162654 | 2/1986 |
| JP | H07-295682 | 11/1995 |
| WO | WO 2005/121688 | 12/2005 |
| WO | WO 2013/080058 | 6/2013 |
| WO | WO 2013/102869 | 7/2013 |
| WO | WO 2013/119983 | 8/2013 |
| WO | WO 2014/062725 | 4/2014 |
| WO | WO 2014/150076 | 9/2014 |
| WO | WO 2016/014655 | 1/2016 |
| WO | WO 2019/222422 | 11/2019 |
| WO | WO 2019/222426 | 11/2019 |

OTHER PUBLICATIONS

Ackerman, S., "It Only Took the Army 16 Years and 2 Wars to Deploy this Network", Wired.com, Jun. 28, 2012, in 7 pages. URL: http://www.wired.com/dangerroom/2012/06/army-data-network-war/all/.

Armstrong, S. C., "Project Manager Soldier Weapons Program Overview NDIA", May 15, 2012, in 38 pages.

Schott—Glass Made of Ideas, GBPS-MC-GOF-Demo, dated Jan. 2006, pp. S.1-S.8, in 8 pages.

Sklarek, W., "High Data Rate Capabilities of Multicore Glass Optical Fiber Cables, 22 FGT 'Otische Polymerfasern'", dated Oct. 25, 2006, in 19 pages. URL: http://www.pofac.de/downloads/itgfg/fgt2.2/FGT2.2_Munchen_Sklarek_GOF-Buendel.

Tao, R. et al., "10 Gb/s CMOS Limiting Amplifier for Optical links", Proceedings of the 29th European Solid-State Circuits Conference, Sep. 16-18, 2013, pp. 285-287, Estoril, Portugal, in 3 pages.

Zhu, Z. et al., "AR-Weapon: Live Augmented Reality Based First-Person Shooting System", 2015 IEEE Winter Conference on Applications of Computer Vision, Feb. 2015, in 8 pages.

(56) References Cited

OTHER PUBLICATIONS

U.S. Appl. No. 13/674,895, filed Nov. 12, 2012, titled Intrapersonal Data Communication System, listing David Michael Masarik as an inventor, in 95 pages, and its entire prosecution history.

* cited by examiner

SHUTTERLESS CALIBRATION

BACKGROUND OF THE INVENTION

1. Field of the Invention

The present disclosure relates to imaging systems, and more particularly to calibration of sensors for imaging systems.

2. Description of Related Art

Traditional uncooled Long Wave Infrared (LWIR) focal plane arrays (FPAs) produce highly non-uniform image data. The use of a non-uniformity correction (NUC) algorithm is traditionally required to improve image quality. Most traditional NUC algorithms use a thermally uniform shutter that is periodically placed in front of the FPA to correct for 1/f type drift which cannot be calibrated out of the image data. This method interrupts live video every time the shutter is closed, adds mechanical complexity, adds cost, and causes an audible sound.

The conventional techniques have been considered satisfactory for their intended purpose. However, there is an ever present need for improved calibration for imaging systems. This disclosure provides a solution for this need.

SUMMARY OF THE INVENTION

An imaging system includes a focal plane array including an array of pixels. An isothermal diaphragm covers a first portion of the pixels along a periphery of the array and exposing an imaging portion of the pixels. A controller is operatively connected to the focal plane array to read sensor data from the focal plane array, wherein the sensor data includes image data from the imaging portion of the pixels and non-uniformity data from the first portion of the pixels. The controller is operatively connected to the focal plane array to enhance the image data based on the non-uniformity data.

The array of pixels can be rectangular, wherein the isothermal diaphragm covers a portion of the pixels along at least two perpendicular edges of the periphery of the array. The array of pixels can be rectangular, wherein the isothermal diaphragm covers a portion of the pixels along four edges of the periphery of the array. The isothermal diaphragm can permanently covers the portion of the pixels along the periphery of the array. The focal plane array can be uncooled.

The focal plane array can be sensitive to wavelengths in a long wave infrared (LWIR) band. The focal plane array can be a first focal plane array that is sensitive to wavelengths in a first band and at least one additional focal plane array can be operatively connected to the first focal plane array for multi-band imagery, wherein the imaging portion of the pixels define an imaging array with an aspect ratio matched to that of the at least one additional focal plane array.

A method of correcting non-uniformity includes collecting sensor data from a focal plane array that includes an array of pixels, wherein an isothermal diaphragm covers a portion of the pixels along a periphery of the array and exposes an imaging portion of the pixels, wherein the sensor data includes an image portion of the sensor data from the imaging portion of the pixels and non-uniformity data from the portion of the pixels that are covered by the isothermal diaphragm. The method includes using the non-uniformity data to perform a non-uniformity correction on the image portion of the sensor data.

Performing the non-uniformity correction can include correcting for non-uniformity that is at least one of column correlated and row correlated. Performing the non-uniformity correction can include using a spatial estimation technique. Collecting sensor data can include acquiring an image in the LWIR band. Acquiring the image, collecting the sensor data, and performing the non-uniformity correction can be performed without actively cooling the focal plane array. The method can include obtaining images while the isothermal diaphragm covers the portion of the pixels along the periphery of the array.

Collecting sensor data can include acquiring a stream of video data from the imaging portion of the pixels and periodically collecting the correction portion of the sensor data from the portion of the pixels that are covered by the isothermal diaphragm while acquiring the stream of video data without interrupting the acquisition of the stream of video data. Acquiring the stream of video data can include acquiring the stream of video data without interruption from a mechanical shutter covering the focal plane array.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
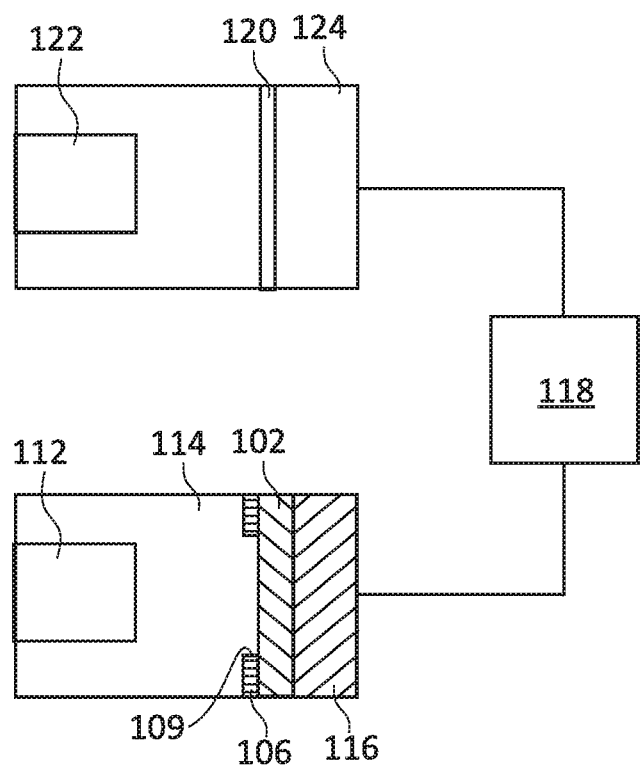
FIG. 1 is a schematic view of an exemplary embodiment of a system constructed in accordance with the present disclosure, showing the focal plane array (FPA) and isothermal diaphragm.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide non-uniformity correction (NUC) in uncooled imaging sensor systems, e.g., uncooled long wave infrared (LWIR) imaging systems.

Figure 3:
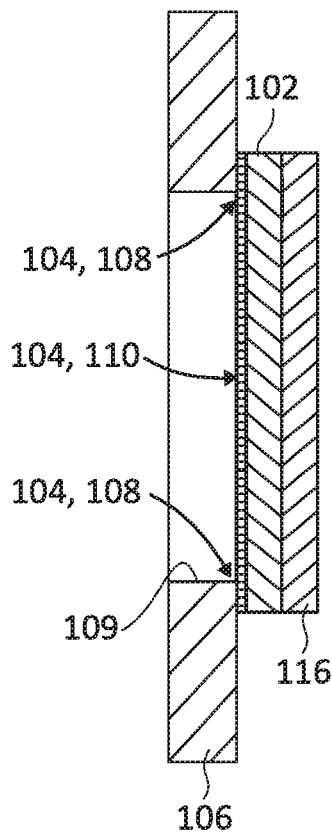
FIG. 3 is a schematic side elevation view of the FPA and isothermal diaphragm, showing the pixels that are covered by the isothermal diaphragm.

The imaging system 100 includes a focal plane array 102 including an array 104 of pixels (labeled in FIG. 3). An isothermal diaphragm 106 covers a portion 108 of the pixels along a periphery of the array 104. The opening 109 through the isothermal diaphragm 106 exposes an imaging portion 110 of the pixels (labeled in FIG. 3). Front end optics 112 optically coupled within a housing 114 with the focal plane array 102 focus images onto the pixels of the focal plane array 102. A controller 116 is operatively connected to the focal plane array 102 to read sensor data from the focal plane array 102 and to enhance, e.g., improve or correct, an image portion of the sensor data. The image portion of the sensor data is from the imaging portion 110 of the pixels. The controller enhances the image portion of the sensor data for non-uniformity based on non-uniformity data that is part of the sensor data, wherein the non-uniformity data is from the portion 108 of the pixels covered by the isothermal diaphragm 106.

With continued reference to FIG. 1, the focal plane array 102 can be sensitive to wavelengths in a long wave infrared (LWIR) band. The focal plane array 102 can be optically aligned on a common platform 118 with one or more additional focal plane arrays 120, e.g., each with respective front end optics 122 and controllers 124, for multi-band imagery, e.g. where the one or more additional focal plane arrays 102 are sensitive to different bands than that of the focal plane array 102. The imaging portion 110 (labeled in FIG. 2) of the pixels define an imaging array with an aspect ratio matched to that of the at least one additional focal plane array 120, e.g., for registration of images from each respective band.

Figure 2:
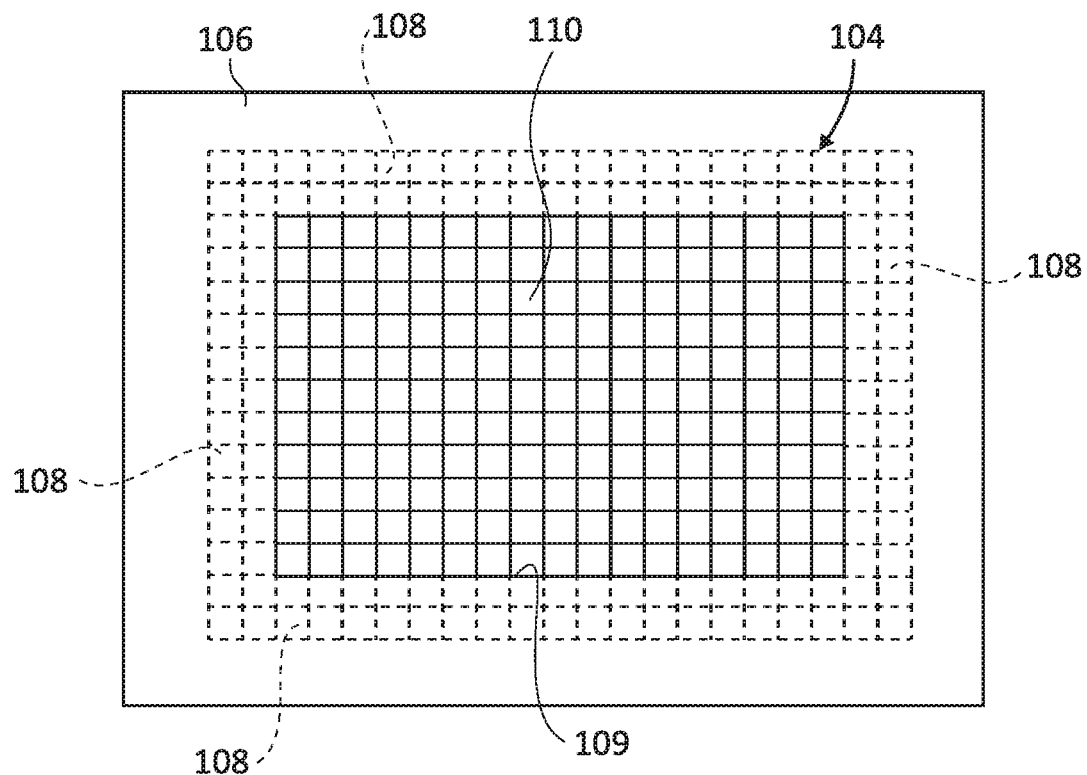
FIG. 2 is a schematic plan view of the FPA and isothermal diaphragm of FIG. 1, showing the imaging portion of the pixels and the pixels along the periphery of the array of pixels that are covered by the isothermal diaphragm.

With reference now to FIG. 2, the array 104 of pixels is rectangular. Since the isothermal diaphragm 106 covers the portion 108 of the pixels along at least two perpendicular edges of the periphery of the array 104, the non-uniformity correction can include correcting for non-uniformity that is at least one of column correlated and row correlated. Given that the isothermal diaphragm covers the portion 108 of the pixels along four edges of the periphery of the array 104, pixels from all for edges can be used in performing the non-uniformity correction, which include using a spatial estimation technique. The non-uniformity data from the portion 108 of the pixels is known to be isothermal because the diaphragm 106 is isothermal. Variations in the non-uniformity data reveal the non-uniformity resulting, e.g., from temperature variance across the focal plane array 102, random row and column flicker noise (1/f noise) introduced by the pixel readout circuit, and the like. Knowing this non-uniformity can allow the controller 116 to correct the image data from the imaging portion 110 of the pixels. The isothermal diaphragm 106 permanently covers the portion 108 of the pixels along the periphery of the array 104, and the focal plane array 102 can be uncooled and does not require mechanical movement of a calibration shutter for non-uniformity correction.

A method of correcting non-uniformity includes collecting sensor data from a focal plane array, e.g., focal plane array 102, that includes an array of pixels, wherein an isothermal diaphragm, e.g., isothermal diaphragm 106, covers a portion, e.g., portion 108, of the pixels along a periphery of the array and exposes an imaging portion, e.g., imaging portion 110, of the pixels. The sensor data includes an image portion of the sensor data from the imaging portion of the pixels and non-uniformity data from the portion of the pixels that are covered by the isothermal diaphragm. The method includes using the no-uniformity data to perform a non-uniformity enhancement on the image portion of the sensor data.

Collecting sensor data can include acquiring an image in the LWIR band. Acquiring the image, collecting the sensor data, and performing the non-uniformity correction can all be performed without actively cooling the focal plane array.

The method can include obtaining images while the isothermal diaphragm covers the portion of the pixels along the periphery of the array. Collecting sensor data can include acquiring a stream of video data from the imaging portion of the pixels. The method can include periodically collecting the correction portion of the sensor data from the portion of the pixels that are covered by the isothermal diaphragm while acquiring the stream of video data without interrupting the acquisition of the stream of video data. The only need to limit how often the non-uniformity data is acquired is the computational resources of the controller 116. Acquiring the stream of video data can include acquiring the stream of video data without interruption from a mechanical shutter covering the focal plane array.

The methods and systems of the present disclosure, as described above and shown in the drawings, provide for non-uniformity correction, e.g., in uncooled LWIR imaging systems, with superior properties relative to traditional systems including elimination of interruption of live video for shutter-based calibration, reduced mechanical complexity, lower cost, and elimination of audible shutter noises. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging system comprising:
   a focal plane array including an array of pixels configured to detect long wavelength infrared radiation;
   a diaphragm covering a first portion of the pixels along a periphery of the array and exposing an imaging portion of the pixels, the diaphragm configured to have a uniform temperature across a surface of the diaphragm, and
   a controller operatively connected to the focal plane array to read sensor data from the focal plane array, wherein the sensor data includes image data from the imaging portion of the pixels and non-uniformity data from the first portion of the pixels, wherein the controller is operatively connected to the focal plane array to enhance the image data based on the non-uniformity data,
   wherein the array of pixels is rectangular, and wherein the diaphragm covers a portion of the pixels along at least two perpendicular edges of the periphery of the array, and wherein the controller is configured to correct for column-correlated and row-correlated non-uniformity.

2. The system as recited in claim 1, wherein the array of pixels is rectangular, and wherein the diaphragm covers a portion of the pixels along four edges of the periphery of the array.

3. The system as recited in claim 1, wherein the focal plane array is sensitive to wavelengths in a long wave infrared (LWIR) band.

4. The system as recited in claim 1, wherein the focal plane array is a first focal plane array that is sensitive to wavelengths in a first band and further comprising at least one additional focal plane array operatively connected to the first focal plane array for multi-band imagery, wherein the imaging portion of the pixels define an imaging array with an aspect ratio matched to that of the at least one additional focal plane array.

5. The system as recited in claim 1, wherein the focal plane array is uncooled.

6. The system as recited in claim 1, wherein the diaphragm permanently covers the portion of the pixels along the periphery of the array.

7. The system as recited in claim 1, wherein the controller is configured to perform a non-uniformity correction on the imaging portion of the pixels based at least in part on the row-correlated non-uniformity, the column-correlated non-uniformity, or both.

8. The system as recited in claim 7, wherein the non-uniformity correction on the imaging portion of the pixels comprises compensating for a non-uniformity comprising a 1/f type drift.

* * * * *